UNITED STATES PATENT OFFICE.

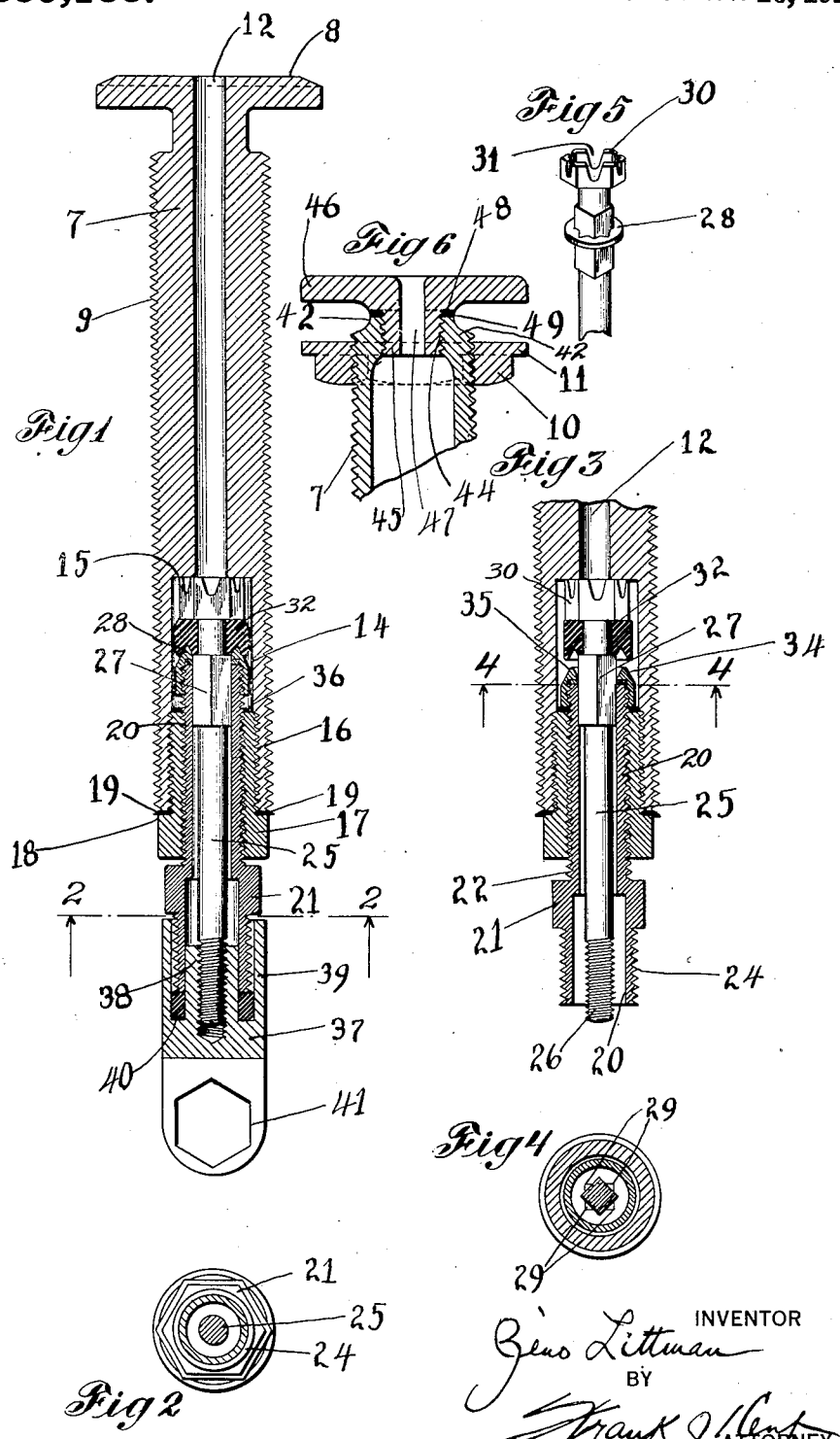

ZENO LITTMAN, OF NEW YORK, N. Y.

VALVE.

1,359,183.   Specification of Letters Patent.   Patented Nov. 16, 1920.

Application filed October 17, 1919. Serial No. 331,387.

*To all whom it may concern:*

Be it known that I, ZENO LITTMAN, a citizen of the United States, residing at New York, in the county of New York and State of New York, have invented certain new and useful Improvements in Valves, of which the following is a specification.

This invention relates to valves, particularly such as are used with pneumatic tires, and among the objects of the invention are to provide a construction including a minimum number of parts and of great simplicity, so that the cost of manufacture and assembly is desirably low; and to provide a construction by which the valve is automatically sealed against escape of air under pressure from the tire and in which there is, in addition, a manually controlled seal.

A further object of the invention is to provide a valve structure including a conduit for the fluid which is to be controlled, a sealing member within the conduit of smaller area than the cross section of the tube and an element movable into operative relations with the sealing member for expanding the same laterally so that its area will be increased and it will make sealing contact with the walls of the tube.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as part of this specification, and in which I have shown merely a preferred form of embodiment of the invention, Figure 1 is an axial section showing the complete valve, sealed against passage of air in either direction, and further sealed by the valve cap; Fig. 2 is a sectional view taken on the line 2—2 of Fig. 1 looking in the direction of the arrows; Fig. 3 is a view similar to Fig. 1, with parts broken away and showing the valve parts in position to permit of the passage of air in one direction (into the tire tube) and sealed against passage of air in the other direction; Fig. 4 is a sectional view taken on the line 4—4 of Fig. 3; Fig. 5 is a detail view of parts of the valve and expander mechanism; Fig. 6 is an axial section showing a modified form of the inner end of the valve casing.

Referring to the numerals on the drawings, there is indicated at 7 in Fig. 1 a valve casing, including an enlarged head 8. The exterior of the casing is threaded at 9 to permit a nut 10 to be screwed up on the casing to force washer 11 tightly against a tube part which is to be clamped between washer 11 and the enlarged head 8. Interiorly the shell or casing 7 is provided with an axial bore 12, which at the forward end of the shell communicates with an enlarged bore 14, defined by a shoulder 15. Adjacent its outer end, the shell 7 is interiorly threaded as indicated at 16, to receive a correspondingly threaded nipple 17 which has a stop shoulder 18 that compresses a gasket 19 between it and the end of the shell. This nipple 17 is interiorly threaded as shown to accommodate a tubular member 20, having intermediate its ends a wrench portion 21, and on one side of the wrench portion 21 exterior threads 22 engaging with the interior threads of the thimble 17, and on the other side of the wrench portion 21 an exteriorly threaded portion 24 for engagement with the usual pump nipple. The wrench portion 21 limits the inward travel of the tubular member 20. 25 indicates a stem, threaded at its outer end as indicated at 26, and at its inner end it is provided with a squared or other non-circular cross section indicated at 27, the purpose of which is to hold in non-rotative relation to it a washer 28, which has a perforation of such shape that it will not rotate with respect to the squared portion 27 but is nevertheless spaced from said squared portion at points 29, Figs. 3 and 4. At the inner end of the stem 25, that is to say inwardly of the squared portion 27, there is a cupped head 30 with the sides cut out as indicated at 31, the concavity of the cup facing, as shown in Figs. 3 and 4, that is, toward the bore 12 of the shell when the parts are in operative position. The cupped head affords support and backing for a sealing member 32, of rubber or other suitable material, which is, in its normal condition, of smaller area than the cross section of the interior of the enlarged bore 14 of the shell. After this washer 32, which is of course centrally perforated, is slipped on over the outer end of the stem 25 until it reaches the position shown in Figs. 3 and 1, abutting against the bottom of the cup 30, an interiorly threaded cap 34 having a beveled end 35 is slipped on over the end of the stem 25, and then the washer 28 is put on, the latter assuming a position inside of the expander cap 34, as clearly shown in Figs. 1 and 3. The tubular member 20 is now put over the stem 25 and the end of its threaded portion 22 screwed down into the interior threads of the cap 34. By reason of this construction, when the parts are in the position shown in Figs. 1 and 3, it is evident that rotation of the tubular member 20 in a clockwise direction, will cause rotation in the same direction of the stem 25 and of the parts rigid therewith; and rotation of the stem in a contra-clockwise direction will carry the tubular member 20 with it. At the inner end of the thimble 17 I prefer to provide a gasket 36, so that when the parts are in the Fig. 3 position the rear end of the cap 34 coming in contact with the gasket 36 will constitute a seal between the bore 14 and the spaces between the interior threads of the shell 7 and the exterior threads of the thimble 17, and between the interior threads of the thimble 17 and the exterior threads 22 of the tubular member 20. So that if the cup 30 and sealing member 32 be driven downwardly (with respect to Fig. 3) by reason of excess of pressure coming from the bore 12, the sealing member 32 will be automatically driven into contact with the beveled end 35 of the cap 34 and the sealing off of the bore 14 will be complete. When a tire is being pumped up, however, assuming the tubular member 20 and cap 34 to be in the Fig. 3 position, the excess of the pressure coming from the pump over the pressure within the tire will drive the sealing member 32 out of the sealing position and into the Fig. 3 position thereof, so that air coming through the interior of the tubular member 20 may pass, by way of openings 29 in washer 28 and openings 31 in the cup 30, into the bore 12. As soon as pressure is no longer supplied from the outside and pressure from within the tire operates, the cup 30 is driven downwardly from the Fig. 3 position thereof and the sealing member 32 assumes its sealing relation with the cap 34. Thus is accomplished the automatic sealing. But in order to insure a positive seal in addition, it is desirable to perform a manual operation which results in the creation of still another seal between the bore 12 and the outer air. This sealing may be accomplished by applying a wrench to the wrench portion 21 of the tubular member and turning it in a clockwise direction, this resulting in the movement upwardly (with reference to Figs. 1 and 3) of the tubular member and the cap 34. After the cup 30 comes in contact with the shoulder 15 the longitudinal movement of the stem of course ceases, though its rotative movement continues. The result is the beveled forward end 35 of the cap 34 drives down into the sealing member 32, compresses the same between the cap 34 and the bottom of the cup 30 and spreading the sealing member laterally as shown in Fig. 1, so that the sides of the sealing member come into sealing contact with the wall of the bore 14. Where no wrench is available I may accomplish the same sealing result by applying to the threaded end 26 of the stem 25 a cap 37 (Fig. 1). This valve cap has an inner annular wall 38 and an outer annular wall 39. The inner wall 38 is interiorly threaded for co-action with the threaded outer end 26 of the stem 25, and a gasket 40 is seated in the bottom of the annular well established between the two walls 38 and 39. Thus when the valve cap is mounted on the outer end of the valve stem 25 as described, and turned in a clockwise direction, the result is the same as when a wrench is applied to the wrench portion 21. For convenience the outer end of the valve cap 37 may be provided with a wrench portion 41 as shown in Fig. 1. Also, it will be evident that by properly proportioning and relating the parts, as the valve cap 37 is turned down, the gasket 40 will be forced tightly against the outer end of the tubular member 20, providing additional security, if such is needed, against leakage of air from the tire.

In Fig. 6 I have shown a modified form of end construction for the shell 7. Here the shell is reduced at the end as indicated at 42 and interiorly threaded as indicated at 44, and engaging in this threaded portion 41 is a boss 45 exteriorly threaded to correspond with the threads 44 and projecting from an end piece 46, the end piece and its integral boss being centrally bored as at 47. The end piece 46 adjacent the boss 45 is shouldered as indicated at 48, and between this shoulder and the adjacent end of the reduced portion 42 of the shell 7 is a gasket 49, which, when the boss 45 is turned down, is compressed, for obvious reasons. This form of construction enables me to make the valve shell very simply and economically.

I claim:—

1. A device of the kind described, comprising a shell having a small bore and a larger bore connected with the smaller bore, the bottom of the larger bore defining a seat about the smaller bore, the outer end of the shell being internally threaded, an externally and internally threaded thimble threaded into the internally threaded end of the shell, an externally threaded tubular member threaded into the interior of the thimble and having a perforated expander cap at its inner end, a stem extending through the tubular member and through the expander cap, means connecting the stem and the tubular member together for simultaneous rotative movement in one direction while permitting relative longitudinal movement thereof, a head carried by the inner end of the stem, and a compressible and laterally expansible sealing element surrounding the stem and resting against said head, the expander cap being urged into contact with the sealing element when the tubular member is screwed down into the thimble.

2. In a device of the kind described, a casing having a passage, and a sealing device in said passage comprising a laterally expansible sealing element adapted to form a seal across the passage when expanded and an expander longitudinally movable into and out of contact with the sealing element, the expander having a threaded connection with the shell to give it longitudinal travel, the sealing element and the expander being connected together for rotative movement, but relatively longitudinally movable.

3. In a device of the kind described, a tubular shell having a large bore at its outer end and a smaller bore opening into the large bore, the bottom of the large bore defining a seat, and the outer end of the large bore internally threaded, an internally and externally threaded thimble threaded into the outer end of the large bore and having a stop portion to engage the end of the shell, a tubular member externally threaded and engaged in the internal threads of the thimble, a perforated expander cap having threaded engagement with the inner end of the tubular member, a member longitudinally slidable in the tubular member and cap but rotative therewith, and a compressible and laterally expansible sealing element carried by the sliding member and adapted to be expanded upon relative longitudinal travel of the expander in one direction.

4. In a device of the kind described, a tubular shell having a large bore at its outer end and a smaller bore opening into the large bore, the bottom of the large bore defining a seat, and the outer end of the large bore internally threaded, an internally and externally threaded thimble threaded into the outer end of the large bore and having a stop portion to engage the end of the shell, a gasket between the stop and the end of the shell and another gasket at the inner end of the thimble, a tubular member externally threaded and engaged in the internal threads of the thimble, a perforated expander cap having threaded engagement with the inner end of the tubular member, a member longitudinally slidable in the tubular member and cap but rotative therewith, and a compressible and laterally expansible sealing element carried by the sliding member and adapted to be expanded upon relative longitudinal travel of the expander in one direction.

5. In a device of the kind described, a tubular shell having a large bore at its outer end and a smaller bore opening into the large bore, the bottom of the large bore defining a seat, and the outer end of the large bore internally threaded, an internally and externally threaded thimble threaded into the outer end of the large bore and having a stop portion to engage the end of the shell, a tubular member externally threaded and engaged in the internal threads of the thimble, a perforated expander cap having threaded engagement with the inner end of the tubular member, a member longitudinally slidable in the tubular member and cap but rotative therewith, a compressible and laterally expansible sealing element carried by and loosely surrounding the sliding member, and adapted to be expanded upon relative longitudinal travel of the expander in one direction, and a head at the end of the sliding member, against which the sealing element is compressed by the expander.

6. In a device of the kind described, a casing having a passage and a seat, a stem longitudinally movable in the casing and having a head for engagement with said seat, a laterally expansible sealing element carried by the stem and adapted to be expanded against the head to form a seal across the passage, a tubular member surrounding the stem and longitudinally adjustable in the casing and an expander carried by said tubular member and engageable with the expansible element.

7. In a device of the kind described, a casing having a passage and a seat, a stem longitudinally movable in the casing and having a head for engagement with said seat, a laterally expansible sealing element carried by the stem and adapted to be expanded against the head to form a seal across the passage, a tubular member surrounding the stem and longitudinally adjustable in the casing, an expander carried by said tubular member and engagable with the expansible element on the inward movement of the tubular member in the casing and a packing between the tubular member and casing engageable by the expander upon the outward adjustment of the tubular member.

8. In a device of the kind described, a casing, a tubular member adjustable in said casing, a washer at the inner end of said member, a cap secured to the inner end of said tubular member and engaged over said washer, a stem extending through the tubular member and guided by said washer and an expansible element on the stem and adapted to be engaged by the cap aforesaid.

In testimony whereof I affix my signature.

ZENO LITTMAN.